US012507001B2

(12) United States Patent
Kano

(10) Patent No.: US 12,507,001 B2
(45) Date of Patent: Dec. 23, 2025

(54) WORK SITUATION DETECTION DEVICE, COMPUTER-READABLE RECORDING MEDIUM THAT RECORDS PROGRAM, AND WORK SITUATION DETECTION METHOD

(71) Applicant: Panasonic Intellectual Property Corporation of America, Torrance, CA (US)

(72) Inventor: Hiroyuki Kano, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 205 days.

(21) Appl. No.: 18/242,856

(22) Filed: Sep. 6, 2023

(65) Prior Publication Data

US 2023/0412969 A1 Dec. 21, 2023

Related U.S. Application Data

(63) Continuation of application No. PCT/JP2021/046714, filed on Dec. 17, 2021.

(30) Foreign Application Priority Data

Mar. 9, 2021 (JP) ................................ 2021-037214

(51) Int. Cl.
*H04R 1/26* (2006.01)
*H04R 3/00* (2006.01)

(52) U.S. Cl.
CPC ............. *H04R 1/265* (2013.01); *H04R 3/005* (2013.01)

(58) Field of Classification Search
CPC ................................ H04R 1/265; H04R 3/005
USPC .............................................. 381/56, 58, 92
See application file for complete search history.

(56) References Cited

U.S. PATENT DOCUMENTS

| | | | | |
|---|---|---|---|---|
| 11,414,101 B1 * | 8/2022 | Hinojosa | B60W 60/0016 | |
| 2004/0153647 A1 * | 8/2004 | Rotholtz | H04L 9/3247 | 713/176 |
| 2012/0230504 A1 * | 9/2012 | Kuroda | G10K 11/17857 | 381/71.4 |

(Continued)

FOREIGN PATENT DOCUMENTS

| | | |
|---|---|---|
| JP | 62-027862 | 2/1987 |
| JP | 2009-289112 | 12/2009 |

(Continued)

OTHER PUBLICATIONS

International Search Report issued in International Pat. Appl. No. PCT/JP2021/046714, dated Mar. 1, 2022, along with an English translation thereof.

*Primary Examiner* — William A Jerez Lora
(74) *Attorney, Agent, or Firm* — Greenblum & Bernstein, P.L.C.

(57) ABSTRACT

An operation situation detection device includes: at least one microphone that is provided in a chamber to detect a first operation sound which is an operation sound occurring when a predetermined operation is performed in the chamber; a memory that stores in advance a second operation sound which is a typical sound likely to occur when the operation is performed; a calculator that calculates a similarity between the first operation sound and the second operation sound; and a determinator that determines that the operation has been performed, when the similarity is a predetermined value or higher.

10 Claims, 7 Drawing Sheets

(56) References Cited

U.S. PATENT DOCUMENTS

| | | | | |
|---|---|---|---|---|
| 2017/0150256 | A1* | 5/2017 | Christoph | G10L 21/0364 |
| 2019/0142054 | A1* | 5/2019 | Tun | A23N 12/125<br>99/334 |

FOREIGN PATENT DOCUMENTS

| | | |
|---|---|---|
| JP | 2021-156839 | 10/2021 |
| KR | 10-1996489 | 7/2019 |

* cited by examiner

WORK SITUATION DETECTION DEVICE, COMPUTER-READABLE RECORDING MEDIUM THAT RECORDS PROGRAM, AND WORK SITUATION DETECTION METHOD

TECHNICAL FIELD

The present disclosure relates to an operation situation detection device that detects a progress state of a cleaning operation or other operation in a chamber including a plurality of seats in a train, an aircraft, a vessel, a theater, or a movie theater or cinema, or other vehicle or facility, and relates to a computer-readable recording medium that records program and an operation situation detection method therefor.

BACKGROUND ART

Patent Literature 1 discloses a technology for grasping, in an information management center, current positions of cleaning operators by causing each cleaning operator to carry an IC card having a wireless function.

The technology disclosed in Patent Literature 1 enables grasping of the current positions of the cleaning operators, but fails to check whether the cleaning operation has been actually performed.

CITATION LIST

Patent Literature

Patent Literature 1: Japanese Unexamined Patent Publication No. SHO 62-27862

SUMMARY OF INVENTION

The present disclosure has an object of providing an operation situation detection device, a computer-readable recording medium that records a program, and an operation situation detection method for grasping actual performance of an operation with a high accuracy.

Means for Solving Problems

An operation situation detection device according to one aspect of this disclosure includes: at least one microphone that is provided in a chamber to detect a first operation sound which is an operation sound occurring when a predetermined operation is performed in the chamber; a memory that stores in advance a second operation sound which is a typical sound likely to occur when the operation is performed; a calculator that calculates a similarity between the first operation sound and the second operation sound; and a determinator that determines that the operation has been performed, when the similarity is a predetermined value or higher.

DESCRIPTION OF EMBODIMENTS

Figure 1:
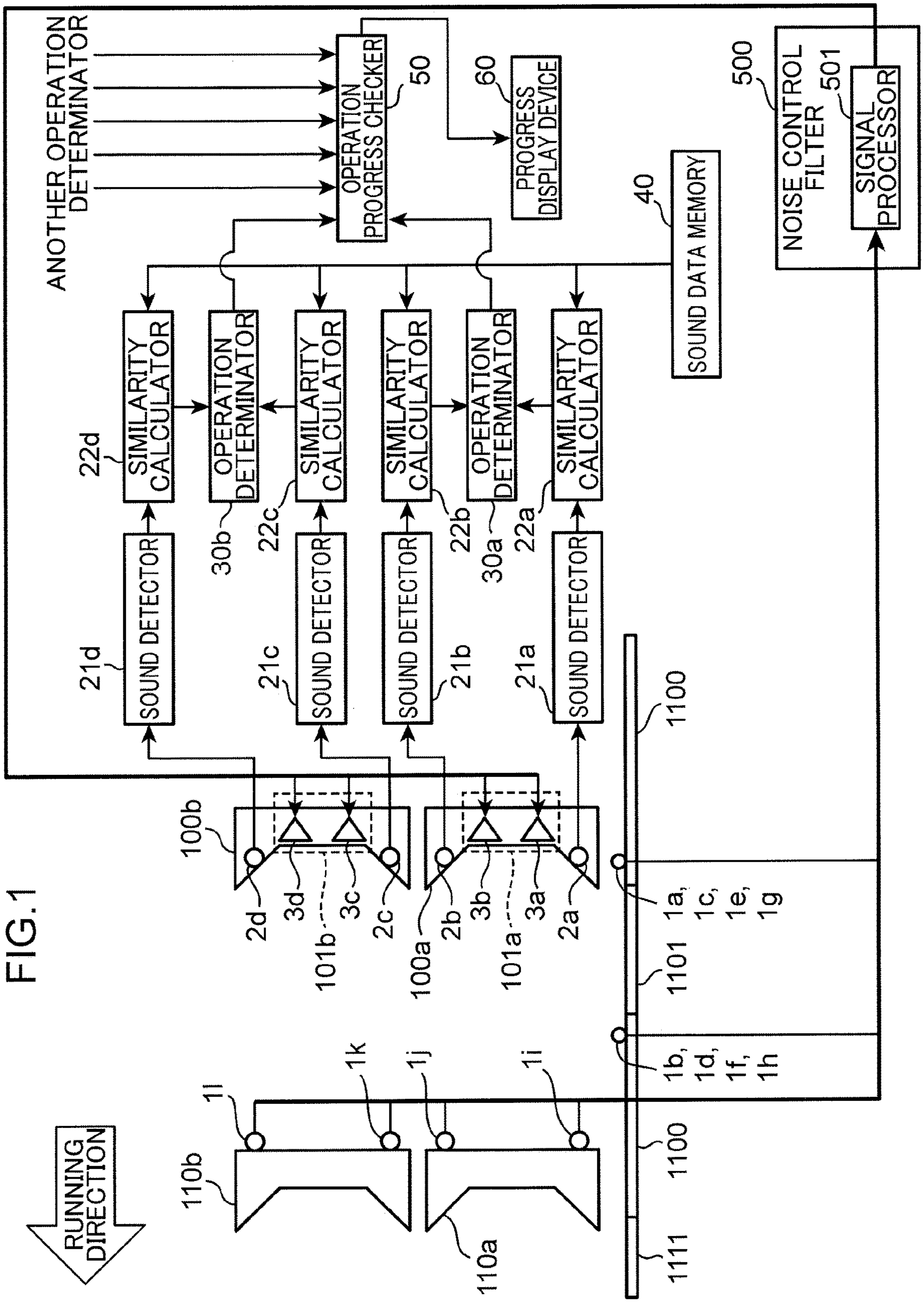
FIG. 1 is a schematic diagram showing a configuration of an operation situation detection device according to an embodiment of the present disclosure.

Knowledge Forming the Basis of the Present Disclosure

A train normally runs between a starting station and a terminal station, passengers get on and off the train at stations located therebetween, and finally no passenger remains in the train at the terminal station. The terminal station then serves as a starting station for return running. In a limited-express or other specific train, a time period before the return running is utilized for a cleaning operation including: mainly cleaning around seats; returning a reclined seat in a lying posture to its original position; changing a seat in a specific direction by rotating the seat; and replacing rest covers.

Similarly, in an aircraft, after all the passengers having boarded at a departure place get off the aircraft at a destination, a time period until next boarding to the aircraft is utilized for a cleaning operation including: mainly tidying-up around seats; and replacing pillow or rest covers.

In a theater or movie theater, after finish of an ongoing play or movie and leaving of spectators, a time period until entering of subsequent spectators is utilized for a cleaning operation including: mainly tidying-up around seats; and returning a reclined seat to its original position.

In this respect, a large number of cleaning operators are required to perform such a cleaning operation all at once to complete the cleaning operation at many locations in the limited time. Thus, improvement in the efficiency of the operation and management or checking of a progress state thereof have been demanded.

Although it is unclear whether a train, an aircraft, or a movie theater as described above is targeted, the technology disclosed in Patent Literature 1 enables an information management center to grasp a current position of each cleaning operator by causing the cleaning operator to carry an IC card or transponder card having a wireless function, and aims at entirely improved work efficiency by giving an instruction to the cleaning operator on the basis of a progress state of the cleaning.

However, the technology disclosed in Patent Literature 1 merely shows which chamber has been cleaned by managing the current position of the cleaning operator carrying the transponder card, but fails to clarify details of contents as to what item among many cleaning items is now being executed in each chamber. If details of contents about the current operation were graspable, appropriately prepared assistance would be available. Otherwise, such preparation is unexpected without the grasping of the details of contents. In other words, further entirely improved efficiency of cleaning operation is unattainable. Besides, it is necessary to arrange fixed stations in respective chambers to receive radio information from each transponder card. This is less applicable to a train, an aircraft, a movie theater, and other facility which is not partitioned into individual divisions and thus has difficulty in appropriate acquisition of positional information about each cleaning operator. The required additional arrangement of the fixed stations further causes problems of a weight increase and a cost increase.

To solve the problems, the present inventor has obtained the knowledge that it is detectable whether a specific operation has been actually performed with a high accuracy by detecting an operation sound occurring when the operation is performed in a chamber, and comparing the detected operation sound with a typical operation sound stored in advance, and the inventor has conceived of the present disclosure on the basis of this knowledge.

Hereinafter, aspects of this disclosure will be described.

An operation situation detection device according to one aspect of this disclosure includes: at least one microphone that is provided in a chamber to detect a first operation sound which is an operation sound occurring when a predetermined operation is performed in the chamber; a memory that stores in advance a second operation sound which is a typical sound likely to occur when the operation is performed; a calculator that calculates a similarity between the first operation sound and the second operation sound; and a determinator that determines that the operation has been performed, when the similarity is a predetermined value or higher.

According to this configuration, the determinator determines that the operation has been performed, when the similarity between the first operation sound detected by the microphone and the second operation sound stored in the memory in advance is the predetermined value or higher. The comparison between the operation sounds results in achieving detection concerning actual performance of the operation with a high accuracy.

This configuration may further include a sound detector that receives a signal concerning the first operation sound from the microphone and extracts, from the received first operation sound signal, a signal component which is in a frequency band defined by a first threshold and has a signal level on a second threshold or higher, and sends the signal component to the calculator.

This configuration enables the sound detector to appropriately detect a time at which a predetermined operation sound occurs, resulting in improving an accuracy of calculating the similarity and thus improving an accuracy of detecting the predetermined operation.

In the configuration, the sound detector may extract a signal component which is in the frequency band and has frequency samples whose signal level is on the second threshold or higher and the number of which is at a ratio on a third threshold or higher with respect to a total number of frequency samples falling within the frequency band.

This configuration further improves the accuracy of calculating the similarity, and thus achieves further improvement in the accuracy of detecting the predetermined operation.

In the configuration, the operation may be performed at a plurality of locations in the chamber, the at least one microphone may include a plurality of microphones respectively arranged at the locations, and the determinator may determine whether the operation has been performed at each of the locations. This configuration may further include: a progress checker that checks, on the basis of a result of the determination by the determinator, a progress state of the operation at each of the locations; and an output part that outputs a result of the checking by the progress checker to present information to the manager.

This configuration permits a manager to grasp a progress state of the operation at each of the locations in the chamber, and accordingly, attains entirely improved efficiency of the operation.

In the configuration, the chamber may include a plurality of seats, the at least one microphones may include a plurality of microphones respectively arranged for the seats, the calculator may calculate a similarity between the first operation sound and the second operation sound from each of the respective microphones for the seats, and the determinator may determine that the operation has been performed to the scats, when the similarity for each of the respective microphones for the seats is the predetermined value or higher.

This configuration achieves further improvement in the accuracy of detecting the predetermined operation by using the microphones respectively arranged for the seats.

In the configuration, the chamber may include a plurality of seats, the at least one microphone may include a noise microphone and an error microphone arranged for each of the seats. This configuration may further include: a signal processor that generates a control signal by performing predetermined signal processing to a noise signal from the noise microphone by using a control coefficient updated on the basis an error signal from the error microphone; and a speaker that is arranged for each seat to output the control signal from the signal processor.

According to this configuration, each of the noise microphone and the error microphone applicable to an active noise control serves as a microphone for detecting an operation sound, and thus contributes to realization of a size reduction and cost saving.

A computer-readable recording medium that records a program according to another aspect of the present disclosure includes: causing a computer provided in an operation situation detection device that includes: at least one microphone that is provided in a chamber to detect a first operation sound which is an operation sound occurring when a predetermined operation is performed in the chamber; a memory that stores in advance a second operation sound which is a typical sound likely to occur when the operation is performed, to serve as: a calculator that calculates a similarity between the first operation sound and the second operation sound; and a determinator that determines that the operation has been performed, when the similarity is a predetermined value or higher.

According to this configuration, the determinator determines that the operation has been performed, when the similarity between the first operation sound detected by the microphone and the second operation sound stored in the memory in advance is the predetermined value or higher. The comparison between the operation sounds results in achieving detection concerning actual performance of the operation with a high accuracy.

An operation situation detection method according to another aspect of the disclosure includes: by an operation situation detection device that includes: at least one microphone that is provided in a chamber to detect a first operation sound which is an operation sound occurring when a predetermined operation is performed in the chamber; and a memory that stores in advance a second operation sound which is a typical sound likely to occur when the operation is performed, calculating a similarity between the first operation sound and the second operation sound; and determining that the operation has been performed, when the similarity is a predetermined value or higher.

According to this configuration, the operation situation detection device determines that the operation has been performed, when the similarity between the first operation sound detected by the microphone and the second operation sound stored in the memory in advance is the predetermined value or higher. The comparison between the operation sounds results in achieving detection concerning actual performance of the operation with a high accuracy.

This disclosure can be realized as a program for causing a computer to execute each distinctive feature included in such a device described above, or realized as a system caused to operate by the program. Additionally, it goes without saying that the computer program is distributable as a non-transitory computer readable storage medium like a CD-ROM, or distributable via a communication network like the Internet.

Embodiment of the Present Disclosure

Hereinafter, an embodiment of the disclosure will be described with reference to the accompanying drawings. The elements given the same reference numerals in different drawings are defined to be the same or corresponding elements.

The embodiment which will be described below represents a specific preferable example of the disclosure.

In the embodiment described below, an active noise control (hereinafter, abbreviated as "ANC") to reduce a noise around a passenger sitting on a seat is exemplified for arrangement of a microphone to detect an operation sound, but the disclosure is not limited thereto.

Further, constituent elements, arrangement and connection of the constituent elements, an operation order, and the like shown in the embodiment described below are mere examples, and do not intend to limit the present disclosure. The present disclosure is defined by the scope of claims.

Moreover, constituent elements which are not recited in the independent claims each showing the broadest concept among the constituent elements in the embodiment are not indispensable to achieve the object of the present disclosure but are described as selectable constituent elements.

Figure 2:
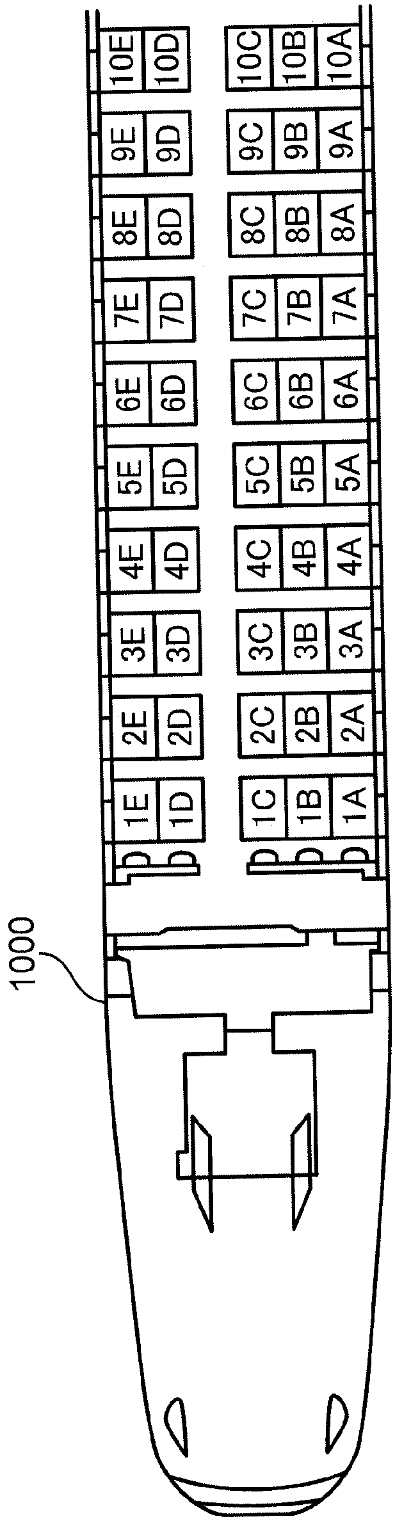
FIG. 2 is a schematic view of an inside of a compartment or chamber of a train.

A configuration of an operation situation detection device according to the embodiment of the disclosure will be described. FIG. 1 is a schematic diagram showing a configuration of an operation situation detection device according to the embodiment of the present disclosure. FIG. 2 is a schematic view of an inside of a compartment or chamber of a train 1000 as an application example of the disclosure.

FIG. 1 shows an application of the operation situation detection device in the inside of the compartment of the train 1000 shown in FIG. 2. FIG. 2 exemplifies seats in the compartment of the train 1000 when the seats are viewed from the top thereof. As seen from the drawing, the train 1000 normally has a seat configuration with a plurality of rows (ten rows in FIG. 2) each including a unit of two seats, e.g., 1D and 1E, and another unit of three seats, e.g., 1A, 1B, and 1C, the units aligning across an aisle. FIG. 1 focuses on the unit of two seats, e.g., 5D and 5E, or 6D and 6E, shown in FIG. 2.

FIG. 1 further exemplifies the inside of the compartment of the train 1000 in a top view thereof. A seat 100*a* on a window side is provided with microphones 2*a*, 2*b* and speakers 3*a*, 3*b*, and a seat 100*b* adjacent thereto on an aisle side is provided with microphone 2*c*, 2*d* and speakers 3*c*, 3*d*. Microphones 1*a* to 1*h* are provided around the window 1101 at a vehicle panel 1100 closer to the seat 100*a*. A seat 110*a* located in a front row of the seat 100*a* has a seatback provided with microphones 1*i*, 1*j* on the back thereof, and a seat 110*b* located in a front row of the seat 100*b* has a seatback provided with microphones 1*k*, 1*l* on the back thereof.

Figure 3:
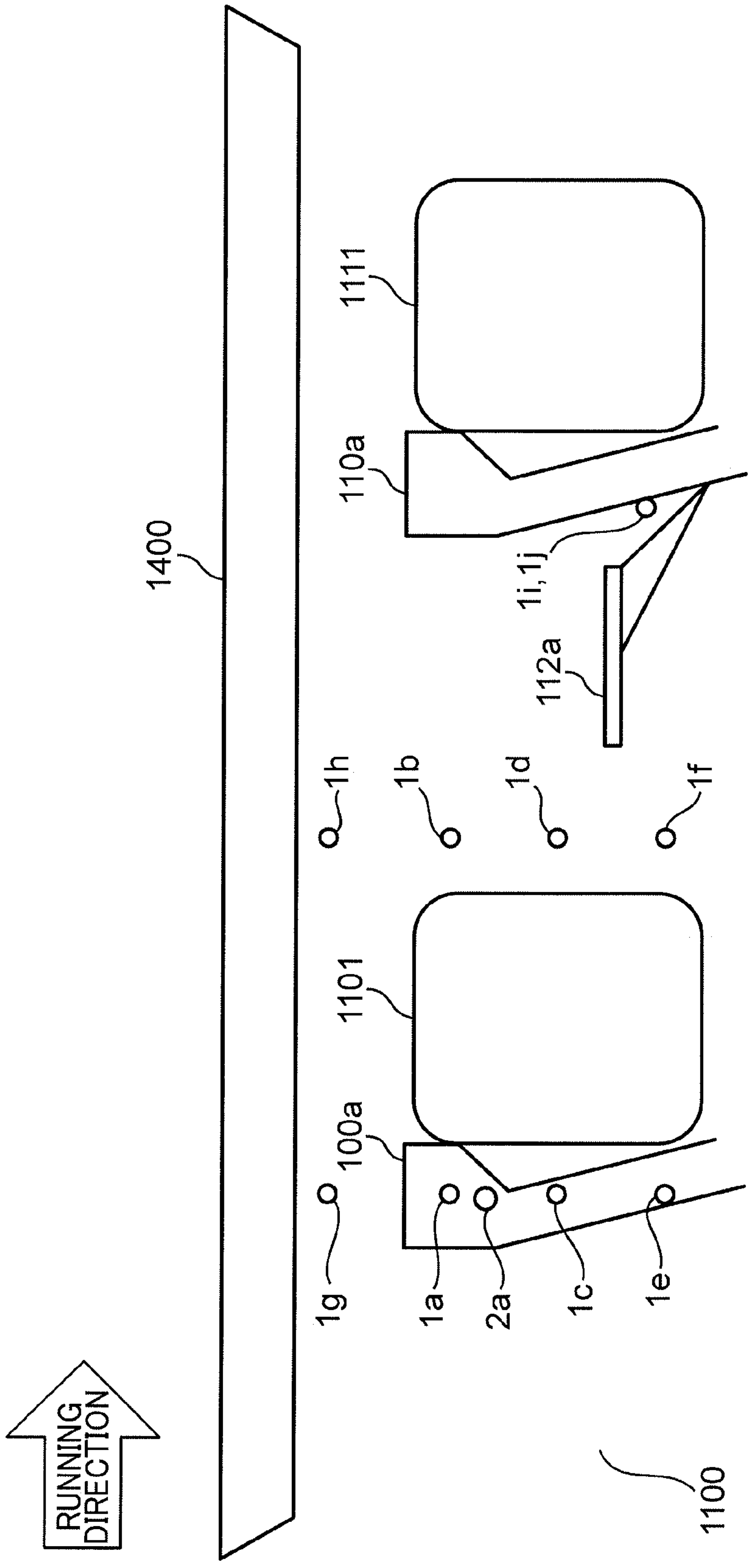
FIG. 3 is a schematic view of the inside of the compartment of the train.

FIG. 3 is a schematic view of the inside of the compartment of the train 1000 and corresponds to a side view of the inside of the compartment, and shows the seat 100*a* on the window side. FIG. 3 omits illustration of the seat 100*b* located adjacent to the seat 100*a*. As shown in FIG. 3, the microphones 1*a* to 1*f* are provided to the vehicle panel 1100 symmetrically across the window 1101 therearound. The microphones 1*g*, 1*h* are arranged at the vehicle panel 1100 and in the vicinity of a luggage rack 1400 located around the window 1101, or arranged at the luggage rack 1400. FIG. 3 omits illustration of microphones which are similar to the microphones 1*a* to 1*h* and located around a window 1111. The microphones 1*i*, 1*j* are provided on the back of the seatback of the seat 110*a*.

Referring to FIG. 1, a noise control filter 500 is configured to receive a detection signal from each of the microphones 1*a* to 1*l*.

Figure 4:
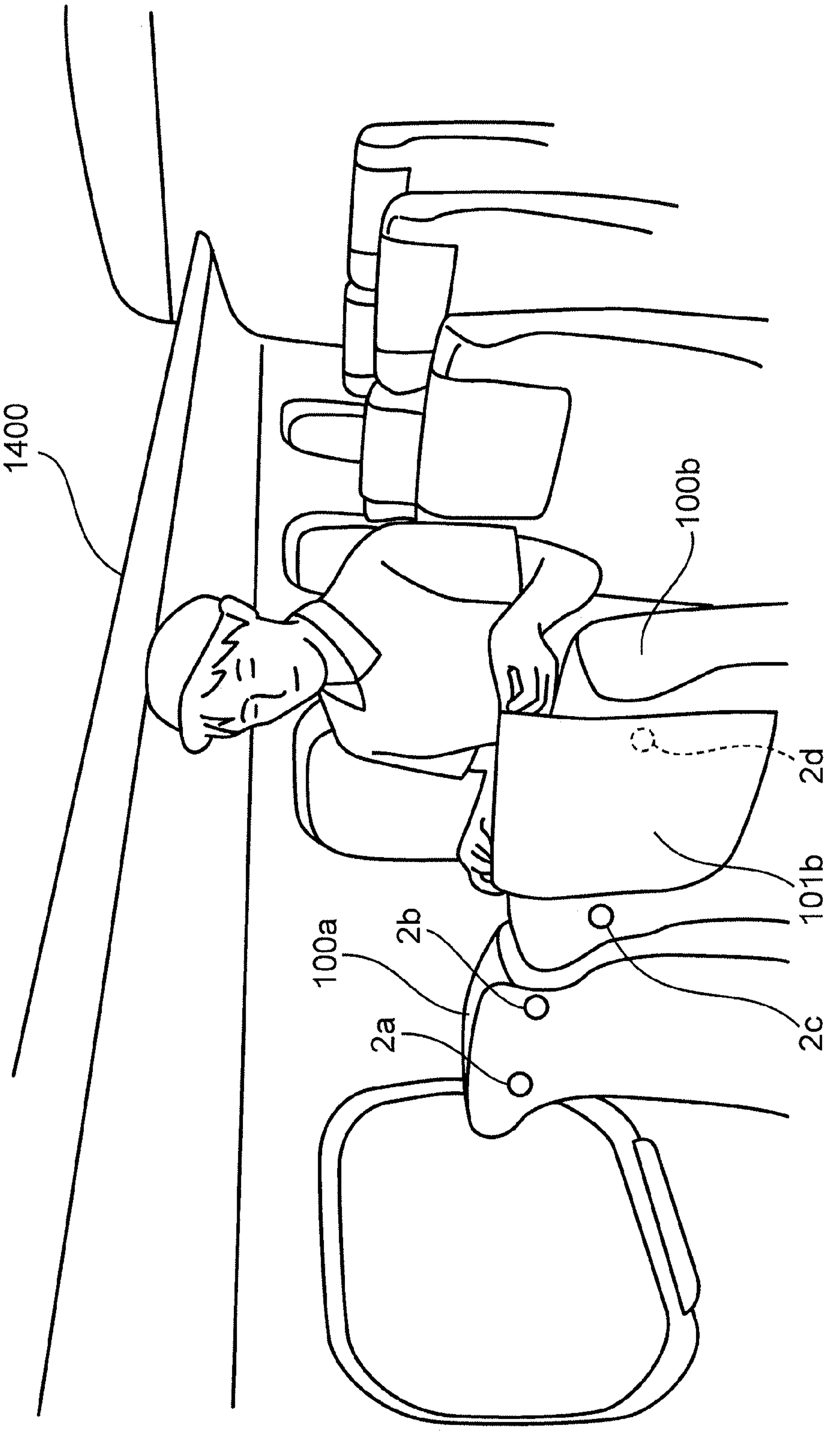
FIG. 4 is an illustration of a replacement operation of a rest cover.

Detection of an operation of replacing rest covers 101 (101*a*, 101*b*) respectively put on headrests of the seats 100*a*, 100*b* will be explained with reference to FIG. 1. FIG. 4 is an illustration of the replacement operation of each rest cover 101. As shown in FIG. 4, the replacement operation of the rest cover 101 includes, by a cleaning operator, removing the used rest cover 101 and replacing the cover with a fresh rest cover 101. The rest cover 101 is normally fastened with hook-and-loop fasteners called "magic tape" (registered trademark), and thus a large sound occurs when the rest cover 101 is removed. As a matter of course, relevant sounds occur in a series of actions including attachment of the cover in the replacement operation. The operation situation detection device according to the embodiment detects these sounds, and determines performance of the replacement operation of the rest cover 101.

Referring to FIG. 1, for instance, the operator first removes the rest cover 101*b* in the replacement operation of the rest cover 101*b* of the seat 100*b*. At this time, an operation sound occurs, and the microphone 2*d* located near the rest cover 101*b* detects the operation sound. A similarity calculator 22*d* receives a signal concerning the operation sound from the microphone 2*d* via a sound detector 21*d*.

A sound data memory 40 stores in advance sound data related to a typical operation sound likely to occur in the replacement operation of the rest cover 101. The similarity calculator 22*d* calculates a similarity between the signal concerning the operation sound received from the microphone 2*d* via the sound detector 21*d* and the sound data from the sound data memory 40. An operation determinator 30*b* receives a signal indicating a result of the calculation by the similarity calculator 22*d*. The operation determinator 30*b* determines that "the replacement operation of the rest cover 101*b* of the seat 100*b* has been performed" when the similarity received from the similarity calculator 22*d* is a predetermined value or higher. An operation progress checker 50 receives a signal indicating a result of the determination by the operation determinator Here, the seat 100*b* is provided with a pair of microphones 2*c*, 2*d* across the rest cover 101*b* from which the operation sound occurs. The microphone 2*c* also detects an operation sound in the replacement operation of the rest cover 101*b* in the same manner as the microphone 2*d*. A similarity calculator 22*c* calculates, in the same manner as the similarity calculator 22*d*, a similarity between a signal concerning the operation sound received from the microphone 2*c* via a sound detector 21*c* and the sound data from the sound data memory 40. The operation determinator 30*h* receives a signal indicating a result of the calculation by the similarity calculator 22*c*. The operation determinator 30*b* determines that "the replacement operation of the rest cover 101*b* of the seat 100*b* has been performed" when each of the similarities received from the similarity calculators 22*c*, 22*d* is a predetermined value or higher. By contrast, when at least one of the similarities received from the similarity calculators 22*c*, 22*d* falls below the predetermined value, the operation determinator 30*b* determines that "the replacement operation of the rest cover 101*b* of the seat 100*b* has not been performed." Use of both the signals concerning the sounds from the microphones 2*c*, 2*d* in this manner leads to improvement in an accuracy of determination by the operation determinator 30*b* as to whether the operation has been performed.

Figure 5:
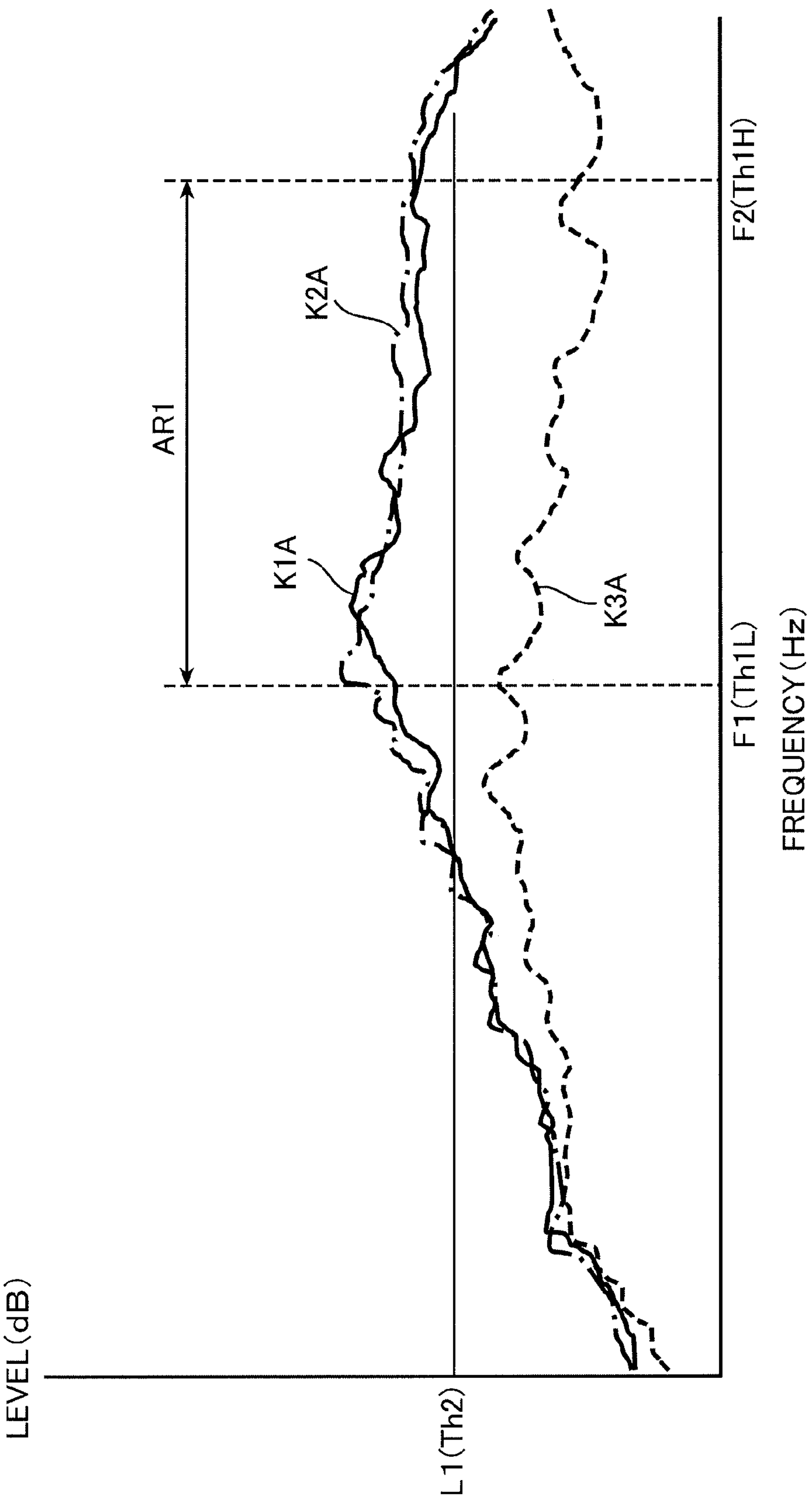
FIG. 5 is a graph showing an example of frequency characteristics of an operation sound.

Here, a way of calculating a similarity by a similarity calculator 22 will be described. FIG. 5 is a graph showing an example of frequency characteristics of an operation sound. A signal concerning an operation sound detected by each of the microphones 2*c*, 2*d* is defined to have frequency characteristics K1A shown in FIG. 5. By contrast, typical sound data stored in the sound data memory 40 has frequency characteristics K2A shown in FIG. 5. The simplest way of calculating the similarity in this case is to obtain a difference between level values per frequency sample, obtain the number of frequency samples having the difference falling within a predetermined range, and determine the similarity on the basis of the obtained number. Specifically, each of the signal (frequency characteristics K1A) concerning the operation sound and the typical sound data (frequency characteristics K2A) has 8192 frequency samples (on the horizontal axis). In this case, the similarity calculator 22 obtains a difference between signal levels (on the vertical axis) of the frequency characteristics K1A, K2A in each frequency sample. For instance, when 6000 frequency samples fall within a predetermined permissible range (e.g., ±5 dB), the similarity is defined to be equal to "6000". The operation determinator 30 determines that the replacement operation of the rest cover 101 has been performed, when the similarity calculated by the similarity calculator 22 indicates, for example, 5000 or more, and determines that the replacement operation of the rest cover 101 has not been performed when the similarity falls below, for example, 5000. When an operation sound exhibits its feature more prominently in time characteristics than in frequency characteristics, the similarity may be calculated by using the time characteristics in place of the frequency characteristics shown in FIG. 5.

For more mathematical calculation of the similarity, a way of calculating a vector distance between the signal concerning the operation sound and typical sound data may be adopted. The similarity is higher as the vector distance is shorter. For instance, a cepstrum distance may be used for the obtained frequency characteristics as shown in FIG. 5. In use of a signal concerning an operation sound and typical data exhibiting time characteristics other than frequency characteristics, for instance, a way of calculating a time variation, obtaining feature vectors on the basis of the calculated time variation, and obtaining a vector distance between the obtained feature vectors.

As described above, each of the similarity calculators 22*c*, 22*d* calculates the similarity between the signal concerning the operation sound in the replacement operation of the rest cover 101*b* and the typical sound data from the sound data memory 40, and the operation determinator determines that the replacement operation of the rest cover 101*b* has been performed, when the similarity is the predetermined value or higher.

Here, external noises, air conditioning sounds or noises, and other noises and sounds cooccur as background noises (background noise characteristics K3A) shown in FIG. 5, in addition to various operation sounds generated by a plurality of cleaning operators, in the compartment of the train 1000. If an operation sound in the replacement operation of the rest cover 101 vanishes into such a background noise having a certain signal level, the similarity calculator 22 fails to accurately calculate the similarity. Thus, the operation determinator 30 fails to accurately determine whether the replacement operation of the rest cover 101 has been performed. To avoid the failure, the similarity calculator 22 compares the sound data with an operation sound detected by a microphone located near a specific place from which a target operation sound is likely to occur. When the target operation sound indicates an operation sound in the replacement operation of the rest cover 101 as described above, the similarity calculator 22 compares the sound data with an operation sound detected by a microphone 2 located near the rest cover 101. In a view from another angle, the operation situation detection device detects whether the operation is completed by using a specific microphone 2 located near a target rest cover 101 in the operation among a plurality of microphones to be used in the ANC which will be described later. Use of the microphone 2 located near the rest cover 101 in this manner enables detection of the operation sound in the replacement operation of the rest cover 101 at a higher signal level, and thus results in achievement in detection of a signal concerning the operation sound having the signal level which is sufficiently higher than the signal level of the background noise shown in FIG. 5. However, even when such a signal concerning the operation sound having the signal level which is sufficiently higher than the signal level of the background noise, other sounds or noises including conversation sounds between the operators occur in addition to the operation sound in the replacement operation of the rest cover 101. It is thus difficult to reliably detect a time when a specific sound which is highly likely to be the operation sound in the replacement operation of the rest cover 101 occurs. A failure to detect an approximate time of the occurrence of the operation sound makes it difficult for the similarity calculator 22*a* to select a specific sound fragment from sounds always detected by the microphone 2 for calculation of the similarity. Inappropriate selection of the specific sound fragment may lead to a failure in obtaining the characteristics of the signal concerning the operation sound as shown in FIG. 5. This may consequently fail to acquire an appropriate result of calculation of the similarity.

To avoid the failure, a frequency band AR1 in which a difference between a signal level about the typical sound data and the signal level of the signal concerning the background noise is sufficiently ensured is defined by thresholds Th1L, Th1H as shown in FIG. 5. The threshold Th1L defines a lower limit frequency F1 in the frequency band AR1 and the threshold Th1H defines an upper limit frequency F2 in the frequency band AR1. A signal level L1 at which the signal level about the typical sound data is sufficiently distinguishable from the signal level of the signal concerning the background noise is defined by the threshold Th2. Referring back to FIG. 1, the microphone 2 always detects sounds, and the sound detector 21 analyzes frequency characteristics of a signal concerning each of the sounds one after another. The sound detector 21 determines an occurrence of an operation sound in the replacement operation of the rest cover 101 when observing that the frequency characteristics K1A of the signal concerning the sound subjected to the analysis have a signal level on the threshold Th2 or higher in the frequency band AR1 defined by the threshold Th1 or higher and the threshold Th1 or lower. The sound detector 21 sends, to the similarity calculator 22, the signal concerning the operation sound having the frequency characteristics KIA falling within an evaluation range serving as the frequency band AR1. The similarity calculator 22 calculates the similarity by comparing the signal concerning the operation sound with the typical sound data for the frequency band AR1.

Consequently, the time of the occurrence of the operation sound in the replacement operation of the rest cover 101 is detectable with a high probability, and an appropriate result of the calculation of the similarity by the similarity calculator 22 is also obtainable.

The sound detector 21 may determine the occurrence of the operation sound in the replacement operation of the rest cover 101 when the frequency samples whose signal level is on the second threshold Th2 or higher and the number of which is at a ratio on a third threshold Th3 or higher with respect to a total number of frequency samples falling within the frequency band AR1 from the thresholds Th1L to Th1H of the signal concerning the detected sound. This achieves improvement in the accuracy of detecting the targeted operation sound. The threshold Th3 may be set to, for example, 80%.

Figure 6:
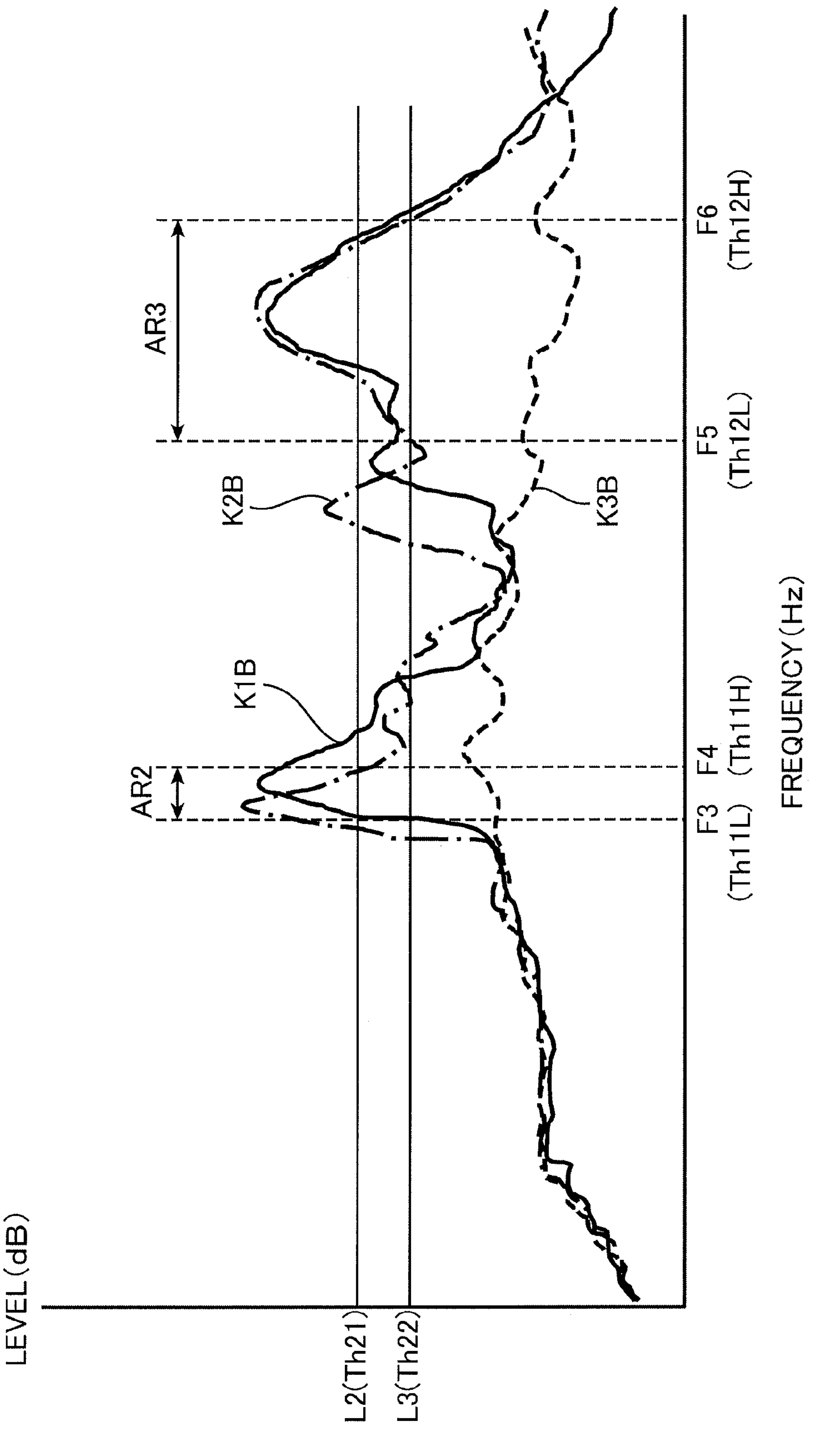
FIG. 6 is a graph showing another example of frequency characteristics of the operation sound.

The thresholds Th1L, Th1H, and the threshold Th2 shown in FIG. 5 may be appropriately set to accurately detect the occurrence of the operation sound and accurately calculate the similarity with the typical sound data. However, an operation sound having characteristics different from those shown in FIG. 5 may occur depending on the contents of the operation. FIG. 6 is a graph showing another example of frequency characteristics of the operation sound. A signal concerning an operation sound detected by each of the microphones 2*c*, 2*d* has frequency characteristics K1B shown in FIG. 6. Typical sound data stored in the sound data memory 40 has frequency characteristics K2A shown in FIG. 6. For instance, when an operation sound shown in FIG. 6 occurs, the occurrence of the operation sound may not be accurately detected only with the one set of thresholds Th1L, Th1H. Here, a plurality of sets of thresholds Th1 of the frequency may be set, for example, a set of thresholds Th11L, Th11H (defining a frequency band AR2 having a lower limit frequency F3 and an upper limit frequency F4) and a set of thresholds Th12L, Th12L (defining a frequency band AR3 having a lower limit frequency F5 and an upper limit frequency F6). Regarding the threshold Th2 of the signal level, a plurality of thresholds Th2 of the signal level may be set, for example, a threshold Th21 (signal level L2) and a threshold Th22 (signal level L3). In other words, a plurality of sets of thresholds Th1 and a plurality of thresholds Th2 may be set in accordance with characteristics of an operation sound. It is a matter of course that the threshold Th3 is set in the same manner.

Referring to FIG. 1, when the operation determinator 30 determines that the replacement operation of the rest cover 101 has been performed, a signal showing a result of the determination is sent from the operation determinator 30 to the operation progress checker 50. The operation progress checker 50 receives inputs of respective performance situations one after another about the replacement operation of the rest covers 101 of seats (including the seats 110*a*, 110*b* in the same vehicle or car and seats in another vehicle) in addition to the seats 100*a*, 100*b*.

Furthermore, the operation progress checker 50 checks or manages operation situations of various kinds of operations including: a cleaning operation of a table 112*a* allotted to each seat; a cleaning operation of the luggage rack 1400; a cleaning operation of a base of each seat with a table broom; a cleaning operation of a floor like an isle with a vacuum cleaner or a buffing machine; and an operation of rotating one or more seats to align in the same direction; and an operation of returning a seat reclined at a specific angle to its original position, in addition to the replacement operation of each rest cover 101.

For instance, in the cleaning operation of the table 112*a* shown in FIG. 3, each of the microphones 1*i*, 1*j* located near the table 112*a* detects an operation sound occurring when the table 112*a* is unfolded to be cleaned, and an operation sound occurring when the table 112*a* is folded hack after the cleaning. A similarity between the detected operation sound and typical sound data related to the operation and stored in the sound data memory 40 is calculated.

For instance, in the cleaning operation of the luggage rack 1400 located above the seat 100*a* as shown in FIG. 3, each of the microphones 1*g*, 1*h* located above the seat 100*a* detects an operation sound in the cleaning operation of the luggage rack 1400. A similarity between the detected operation sound and typical sound data related to the operation and stored in the sound data memory 40 is calculated.

A similarity between an operation sound detected by a microphone located near a place from which a target operation sound is likely to occur and typical sound data related to the operation and stored in the sound data memory 40 is calculated in the same manner for another operation, such as the cleaning operation of each seat base, the cleaning operation of the floor, the operation of rotating a seat, or the operation of returning a seat reclined at a specific angle to its original position. Here, a process described below is applied to such an operation which is not necessarily required for all the seats in the vehicle as the operation of rotating a seat or the operation of returning a seat reclined at a specific angle to is original position. For instance, the operation determinator 30 determines no performance of each of the operations in the vehicle when no operation sound concerning each of the operations is detected in the vehicle, and determines performance of each of the operations in the vehicle when an operation sound in each of the operations is detected even at only one location in the vehicle.

The operation progress checker 50 determines a performance situation of each of the operations on the basis of the calculated similarity concerning each operation, and checks a progress state of each of all the operations in the train 1000. The operation progress checker 50 sends a signal indicating the progress state of each of all the operations to the progress display device 60 to cause the progress display device 60 to display the progress state on a screen thereof. In this manner, an operation manager who manages the entire cleaning of each chamber in the train 1000 can grasp the progress state of each operation in each vehicle at a glance. Therefore, in a case where a delay occurs in a certain operation in a certain vehicle, an instruction of requesting an operator who smoothly proceeds with the operation to give assistance at a location where the delay occurs to complete the operation within a limited time. This results in attainment of entirely improved work efficiency in the train 1000. A way of presenting information indicating a progress state of each of all the operations is not limited to the displaying on the screen of the progress display device 60, and the information may be displayed with a voice output.

A signal may be transmitted from the operation progress checker 50 to the progress display device 60 wirelessly or by using a fixed network system which is established in the train 1000. In the wireless transmission, the progress display device 60 may be a portable device carriable by the operation manager. In the transmission using the fixed network system, the progress display device 60 may be a display device provided in a place where the operation manager is located, or a way of connecting the portable device carried by the operation manager to the fixed network system via a hub may be adopted.

Here, the operation situation detection device shown in FIG. 1 can adopt an ANC system to reduce a running noise in the compartment of the train 1000, and the noise control filter 500 mainly executes signal processing in the ANC system. The execution of the processing will be described below.

In the ANC system, each microphone 1 (1*a* to 1*l*) includes a noise microphone to detect a noise signal, and each microphone 2 (2*a* to 2*d*) includes an error microphone to detect an error signal. The noise control filter 500 causes a signal processor 501 to perform signal processing to the noise signal detected by the noise microphone 1 to reduce a noise at an arrangement position of the error microphone 2, and regenerates the signal as a control sound (control signal) from each speaker 3 (3*a* to 3*d*). The running noise and the control sound interfere with each other at the arrangement position of the error microphone 2, and the error microphone 2 detects a resultant residual signal (error signal). Normally, the noise control filter 500 updates its control coefficient by performing adaptive signal processing to minimize the error signal. Repetitive execution of the processing leads to minimization of the error signal and obtaining of a control coefficient to reduce the running noise.

Figure 7:
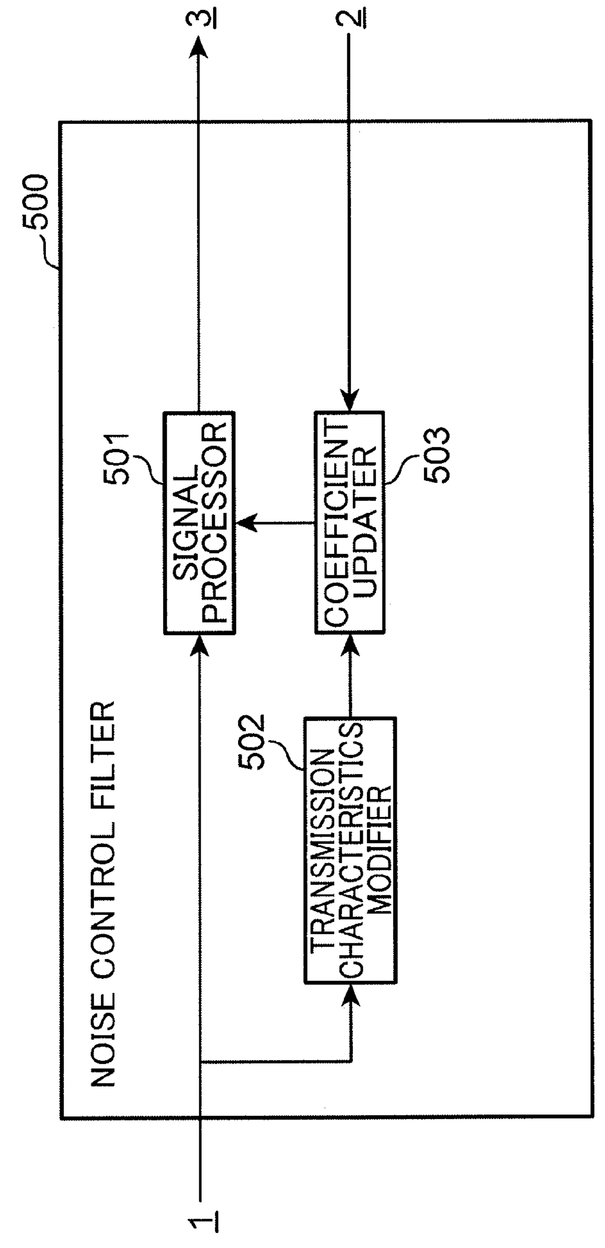
FIG. 7 shows an inner configuration of a noise control filter.

The ANC will be described in more detail. FIG. 7 shows an inner configuration of the noise control filter 500 shown in FIG. 1.

In FIG. 7, the signal processor 501 performs the signal processing to the noise signal detected by the noise microphone 1 with the control coefficient in the signal processor 501, and the speaker 3 outputs a control signal from the signal processor 501. Simultaneously, a transmission characteristics modifier 502 performs signal processing to the noise signal detected by the noise microphone 1 with a coefficient in the transmission characteristics modifier 502.

Here, the transmission characteristics modifier 502 presets, as the coefficient, the transmission characteristics from the speaker 3 to the error microphone 2.

The transmission characteristics modifier 502 performs the signal processing to the noise signal detected by the noise microphone 1 with the coefficient set in this manner, and a coefficient updater 503 receives a signal output from the modifier.

The coefficient updater 503 updates the coefficient of the signal processor 501 to minimize the error signal by performing adaptive signal processing, such as least squares or learning identification, using the signal from the transmission characteristics modifier 502 and the error signal from the error microphone 2. Sequential repetition of the adaptive signal processing leads to minimization of the error signal and obtaining of an optimal control coefficient to reduce the running noise. As a result of the obtaining of the control coefficient of the signal processor 501, the running noise at the arrangement position of the error microphone 2 is minimized.

As described heretofore, in a case where an ANC system already includes the noise microphone 1, the error microphone 2, the speaker 3, and the noise control filter 500, each of the already included noise microphone 1 and error microphone 2 is adoptable as a microphone for an operation situation detection device to achieve a size reduction and cost saving of the system. The ANC system utilizes many microphones, and accordingly realizes checking of a progress state of various kinds of cleaning operations at respective locations in a chamber.

When audio services are focused without limitation to the ANC system, for example, such a system utilizing many microphones as a sound field control system to control a wide area, a directional control system, or a wavefront control system is available in combination with an operation situation detection device.

Although the embodiment exemplifies an application of the device in a train, the application is not limited thereto, and the device may be applied in an aircraft, a vessel, a theater, a movie theater, or other vehicle or facility. In a case of transportation means for many passengers, like a train, an aircraft, or a vessel, it is necessary to complete a cleaning operation in a chamber within a limited time from leaving of current passengers to next boarding or getting-on of subsequent passengers. The operation situation detection device according to the embodiment enables reliable grasping of a progress state of the cleaning operation, and thus, attains entirely improved work efficiency by giving assistance at a location where a delay occurs in the operation. Similarly, in a chamber for providing many people with simultaneous viewing services, e.g., in a theater or a movie theater, it is necessary to complete a cleaning operation in the chamber within a limited time from a finish of an ongoing play or movie and leaving of current spectators to a start of the next play or movie and entering of the next spectators. The operation situation detection device according to the embodiment enables reliable grasping of a progress state of the cleaning operation, and thus, attains entirely improved work efficiency by giving assistance at a location where a delay occurs in the operation.

INDUSTRIAL APPLICABILITY

The present disclosure is particularly applicable to an operation situation detection device that detects a progress state of a cleaning operation or other operation in a chamber including a plurality of seats in a train, an aircraft, a vessel, a theater, a movie theater, or other vehicle or facility.

DESCRIPTION FOR REFERENCE SIGNS

1 (1*a* to 1*l*), 2(2*a* to 2*d*) microphone
3 (3*a* to 3*d*) speaker
21 (21*a* to 21*d*) sound detector
22 (22*a* to 22*d*) similarity calculator
30 (30*a*, 30*b*) operation determinator
40 sound data memory
50 operation progress checker
60 progress display device
500 noise control filter
501 signal processor

The invention claimed is:

1. An operation situation detection device, comprising:

a plurality of microphones that are provided in a chamber to detect a first operation sound which is an operation sound occurring when a predetermined operation is performed in the chamber;

a memory that stores in advance a second operation sound which is a typical sound likely to occur when the operation is performed;

a calculator that calculates a similarity between the first operation sound and the second operation sound with respect to at least one of the plurality of microphones; and a determinator that determines that the operation has been performed, when the similarity is a predetermined value or higher with respect to at least one of the plurality of microphones.

2. The operation situation detection device according to claim 1, further comprising a sound detector that receives a signal concerning the first operation sound from at least one of the plurality of microphones and extracts, from the received first operation sound signal, a signal component which is in a frequency band defined by a first threshold and has a signal level on a second threshold or higher, and sends the signal component to the calculator.

3. The operation situation detection device according to claim 2, wherein the sound detector extracts a signal component which is in the frequency band and has frequency samples whose signal level is on the second threshold or higher and the number of which is at a ratio on a third threshold or higher with respect to a total number of frequency samples falling within the frequency band.

4. The operation situation detection device according to claim 1, wherein the operation is performed at a plurality of locations in the chamber, the plurality of microphones are arranged at the locations, and the determinator determines whether the operation has been performed at each of the locations, the operation situation detection device further comprising:

a progress checker that checks, on the basis of a result of the determination by the determinator, a progress state of the operation at each of the locations; and an output part that outputs a result of the checking by the progress checker to present information to the manager.

5. The operation situation detection device according to claim 1, wherein the chamber includes a plurality of seats, the plurality of microphones are arranged for the seats, the calculator calculates a similarity between the first operation sound and the second operation sound from each of the respective microphones for the seats, and the determinator determines that the operation has been performed to the seats, when the similarity for each of the respective microphones for the seats is the predetermined value or higher.

6. The operation situation detection device according to claim 1, wherein the chamber includes a plurality of seats, the plurality of microphones include a noise microphone and an error microphone arranged for each of the seats, the operation situation detection device further comprising:

a signal processor that generates a control signal by performing predetermined signal processing to a noise signal from the noise microphone by using a control coefficient updated on the basis an error signal from the error microphone; and a speaker that is arranged for each seat to output the control signal from the signal processor.

7. A non-transitory computer-readable recording medium that records a program, the program causing a computer provided in an operation situation detection device that includes:

a plurality of microphones that are provided in a chamber to detect a first operation sound which is an operation sound occurring when a predetermined operation is performed in the chamber; and a memory that stores in advance a second operation sound which is a typical sound likely to occur when the operation is performed, to serve as:

a calculator that calculates a similarity between the first operation sound and the second operation sound with respect to at least one of the plurality of microphones; and a determinator that determines that the operation has been performed, when the similarity is a predetermined value or higher with respect to at least one of the plurality of microphones.

8. An operation situation detection method, comprising:

by an operation situation detection device that includes:

a plurality of microphones that are provided in a chamber to detect a first operation sound which is an operation sound occurring when a predetermined operation is performed in the chamber; and a memory that stores in advance a second operation sound which is a typical sound likely to occur when the operation is performed, calculating a similarity between the first operation sound and the second operation sound with respect to at least one of the plurality of microphones; and determining that the operation has been performed, when the similarity is a predetermined value or higher with respect to at least one of the plurality of microphones.

9. The operation situation detection device according to claim 1, wherein the calculator calculates the similarity between the first operation sound detected by a microphone within a reference distance to a source of the operation sound, among the plurality of microphones, and the second operation sound.

10. The operation situation detection device according to claim 1, wherein the determinator determines that the operation has been performed, when the similarity is a predetermined value or higher with respect to at least two of the plurality of microphones.

* * * * *